J. O. WOLF.
REVOLVING TOOTH HARROW.
APPLICATION FILED OCT. 28, 1912.
1,085,231.
Patented Jan. 27, 1914.
2 SHEETS—SHEET 1.
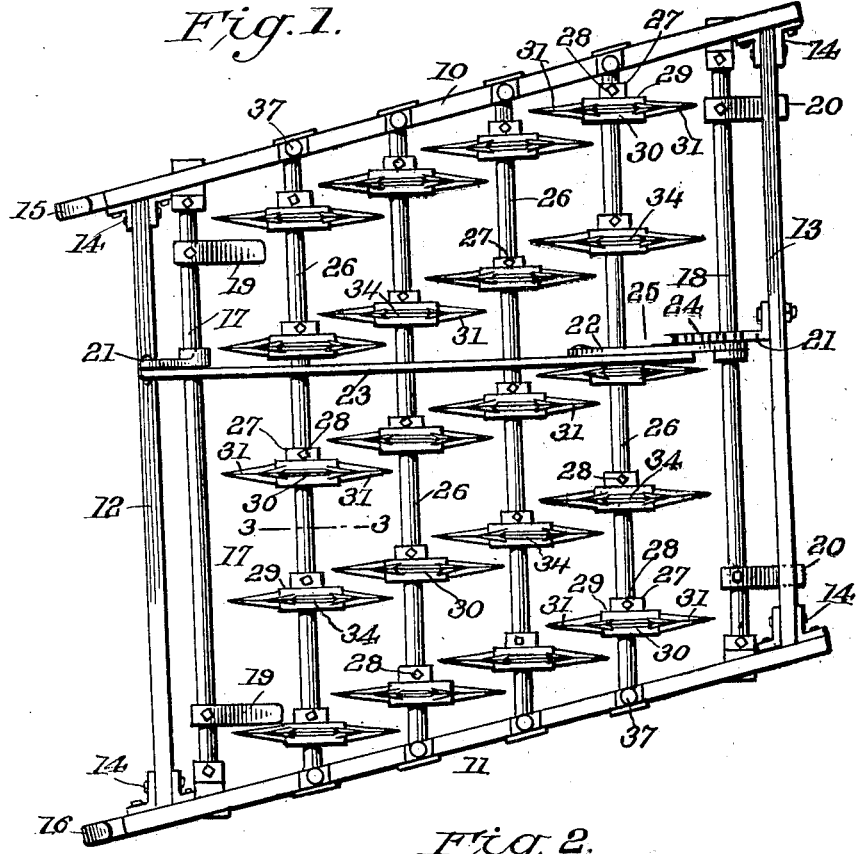
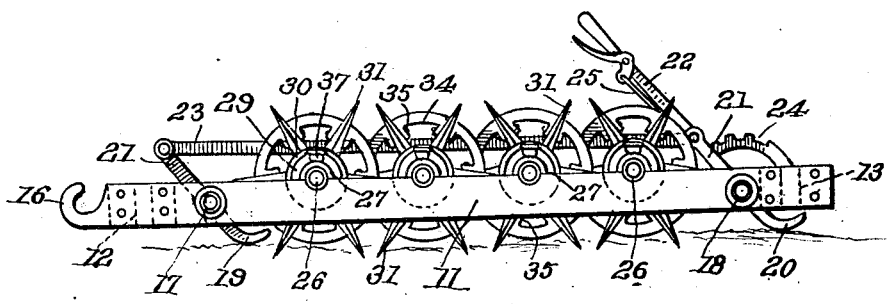
WITNESSES
INVENTOR
J. O. Wolf
Attorneys.

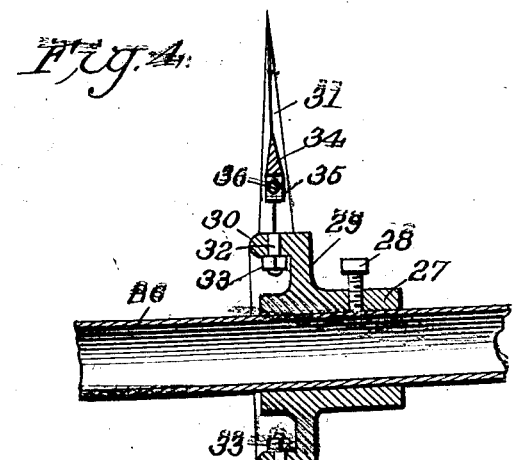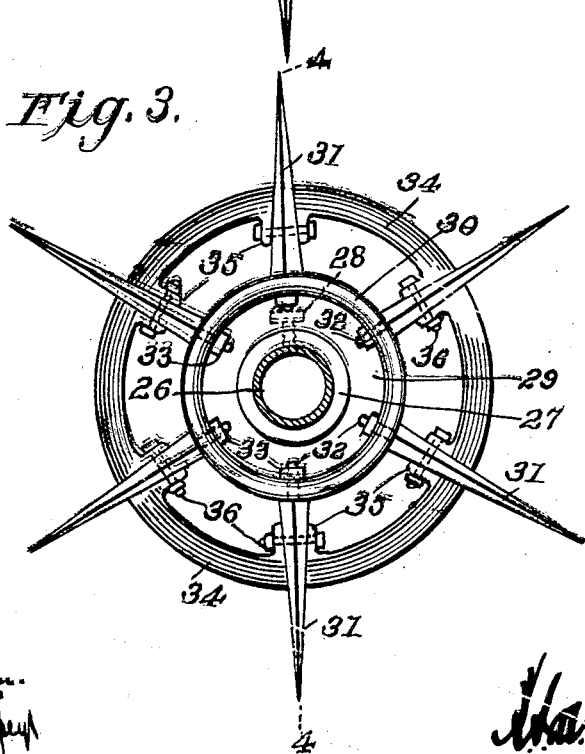

UNITED STATES PATENT OFFICE.

JOSEPH O. WOLF, OF CLARKSON, NEBRASKA.

REVOLVING TOOTH-HARROW.

1,085,231.

Specification of Letters Patent. Patented Jan. 27, 1914.

Application filed October 28, 1912. Serial No. 728,232.

*To all whom it may concern:*

Be it known that I, JOSEPH O. WOLF, citizen of the United States, residing at Clarkson, in the county of Colfax and State of Nebraska, have invented certain new and useful Improvements in Revolving Tooth-Harrows, of which the following is a specification.

This invention relates to improvements in harrows, more particularly to the class of rotary harrows, and has for one of its objects to improve the construction and increase the utility and efficiency of devices of this character.

Another object of the invention is to provide a rotary harrow mounted upon shoes or runners and with means for adjusting the runners vertically to control the depth of cut of the rotary portion of the implement.

Another object of the invention is to provide a rotary harrow having co-acting earth penetrating spikes or teeth and cutting blades or knives operating to sever corn stalks and similar material.

With these and other objects in view, the invention consists in certain novel features of construction as hereinafter shown and described and then specifically pointed out in the claims, and in the drawings illustrating the preferred embodiment of the invention, Figure 1 is a plan view of the improved harrow; Fig. 2 is a side elevation; Fig. 3 is a detail sectional view of one of the combined cutting and rotary cultivating members with the tubular shaft in section on the line 3—3 of Fig. 1. Fig. 4 is a section on the line 4—4 of Fig. 3.

Corresponding and like parts are referred to in the following description and indicated in all of the views of the drawings by the same reference characters.

The improved device comprises side members 10—11, a forward member 12, and a rear member 13. The side members are directed obliquely to the longitudinal plane of the terminal members and are rigidly coupled by bracket 14. The members 10, 11, 12 and 13, together with the brackets, form a rigid supporting frame rhomboid in outline, as shown in Fig. 1. The side member 10 is extended at its forward end and terminates in a draft-hook 15, while the member 11 is extended forwardly and terminates in a draft-hook 16. An evener bar of suitable construction is connected to the hooks 15—16, but as the evener bar forms no part of the present invention it is not deemed necessary to illustrate it.

Mounted for oscillation between the members 10—11 rearwardly of the forward member 12 is a beam 17, and a similar beam 18 is mounted for oscillation forwardly of the rear member 13. Connected to the member 17 and depending beneath the same are curved resilient shoes 19, while similar shoes 20 are connected to the beam 18. The shoes form supports for the frame 10 and bear upon the ground when the frame is drawn forwardly. Rising from the beam 17 is an arm 21, while a lever-arm 22 rises from the beam 18. The arm 21 and the lever 22 are connected by a rod 23. Connected to the rear member 13 of the frame is a notched segment 24 with which a spring actuated pawl 25 carried by the lever 22 engages. By this means it will be obvious that when the lever 22 is actuated, the beam 18 will be oscillated, and by means of the connecting rod 23 and arm 21 the beam 17 will be simultaneously oscillated. By this simple means the resilient shoes are vertically adjusted to elevate or depress the frame 10, and this vertical adjstment may be retained at any desired point through the co-action of the pawl 25 and the notched segment 24.

Mounted for rotation through the side members 10—11 are a plurality of supporting members, preferably sections of gas piping, represented at 26. The members 26 are uniformly spaced and extend in parallel relations to the members 12—13 and obliquely to the members 10—11. The members 26 are all uniform in length and any required number of the members 26 may be employed, but for an ordinary size harrow four of the bars will be used, as shown, and the rotary members are arranged thereon in "staggered" relation, as hereinafter explained.

Each of the bars 26 will be provided with a plurality of combined cutting and rotary harrow members, and as these rotary members are precisely alike the description of one will suffice for all.

Any desired number of the rotary or cutting devices may be employed upon each of the supporting members 26, but for the purpose of illustration five of the devices are shown and arranged upon each supporting member and spaced at equal distances apart, but by arranging the members 26 to engage the members 10—11 at different points, the cutting members are arranged in staggered relation, as shown, so that they do not "trail" or track, but each operate on a separate portion of the soil for obvious reasons.

Each pointed rotary and cutting member comprises a sleeve 27 mounted upon the member 26 and secured in position by a set-screw 28 or similar securing device, so that the sleeves may be adjusted longitudinally of the members 26. Extending from each sleeve is an annular disk 29 having a longitudinally directed flange 30 at the outer edge of each disk. Extending radially from the flange 30 are a plurality of spikes or cutting fingers 31, each spike having a stud 32 extending through the flange 30 and secured in position by a clamping-nut 33 bearing against the inner face of the flange. Any required number of the spikes or fingers may be employed, but generally six will be used upon each flange, as shown. The fingers or teeth are pointed and converge to a point, as shown.

Extending between the teeth intermediate their ends are segmental combined cutting and spike bracing members or knives 34 having inwardly directed ribs 35, each pair of the ribs being secured to one of the spikes or fingers by a rivet or other suitable fastening device 36. The members 34 are formed knife-edged at their outer sides, and when applied to the spikes form a complete circle intermediate the ends of the spikes, as shown in Fig. 3, and supporting and bracing the spikes. By this simple arrangement, it will be obvious that as the harrow is drawn over the ground the spikes 31 penetrate the soil and produce the requisite cultivating action, while the knives 34 serve to sever any corn stalks or weeds which may be encountered. By this simple means the soil is effectually cultivated and all detrimental material cut up into small pieces and buried by the action of the spikes as the machine is drawn over the ground.

The improved device is simple in construction, effectual in action, and very strong and durable.

A suitable oil cup 37, preferably arranged for hard grease, is provided for each of the shafts 26.

Having thus described my invention, what I claim and desire to secure by Letters Patent is:

1. In a device of the class described, a disk member having an annular flange, a plurality of spikes extending radially from said flange, segmental brace members extending respectively between said spikes intermediate their ends, and with knife-edged outer faces and means for attaching said brace members to the spikes.

2. In a device of the class described, a rotative body, a plurality of spikes extending radially from said body, segmental brace members extending respectively between said spikes intermediate their ends and with knife-edged outer faces, and means for attaching said brace members to the spikes.

3. In a device of the class described, a rotative body, a plurality of spikes extending radially from said body, segmental brace members extending respectively between said spikes intermediate their ends and with knife-edged outer faces, and fastening devices connecting each pair of said brace members through one of the spikes.

In testimony whereof I affix my signature in presence of two witnesses.

JOSEPH O. WOLF. [L. S.]

Witnesses:
EMIL PETR,
EMIL E. DUDEK.

Copies of this patent may be obtained for five cents each, by addressing the "Commissioner of Patents, Washington, D. C."